US008953532B2

(12) United States Patent
Liu et al.

(10) Patent No.: US 8,953,532 B2
(45) Date of Patent: Feb. 10, 2015

(54) METHOD AND APPARATUS FOR UPLINK CONTROL SIGNALING

(75) Inventors: Deping Liu, Schaumburg, IL (US); Vipul Desai, Palatine, IL (US); Weimin Xiao, Hoffman Estates, IL (US)

(73) Assignee: Futurewei Technologies, Inc., Plano, TX (US)

( * ) Notice: Subject to any disclaimer, the term of this patent is extended or adjusted under 35 U.S.C. 154(b) by 59 days.

(21) Appl. No.: 13/236,195

(22) Filed: Sep. 19, 2011

(65) Prior Publication Data

US 2013/0070689 A1 Mar. 21, 2013

(51) Int. Cl.
*H04W 72/04* (2009.01)
*H04L 5/00* (2006.01)
*H04L 1/18* (2006.01)

(52) U.S. Cl.
CPC ......... *H04L 5/0094* (2013.01); *H04W 72/0413* (2013.01); *H04L 1/1861* (2013.01); *H04L 1/1893* (2013.01); *H04L 1/1896* (2013.01); *H04L 5/0055* (2013.01); *H04L 5/0035* (2013.01); *H04L 5/001* (2013.01); *H04L 5/0023* (2013.01)
USPC ........................................................ 370/329

(58) Field of Classification Search
CPC ..................... H04L 5/0055; H04W 72/0413
USPC ......................................................... 370/329
See application file for complete search history.

(56) References Cited

U.S. PATENT DOCUMENTS

| 2008/0273513 | A1* | 11/2008 | Montojo et al. | 370/342 |
|---|---|---|---|---|
| 2009/0303956 | A1 | 12/2009 | Chen et al. | |
| 2011/0170496 | A1* | 7/2011 | Fong et al. | 370/329 |
| 2011/0223924 | A1* | 9/2011 | Lohr et al. | 455/450 |
| 2011/0286414 | A1* | 11/2011 | Qu et al. | 370/329 |
| 2011/0310829 | A1* | 12/2011 | Ji et al. | 370/329 |
| 2012/0039275 | A1* | 2/2012 | Chen et al. | 370/329 |
| 2012/0140712 | A1* | 6/2012 | Yamada et al. | 370/329 |
| 2013/0114561 | A1* | 5/2013 | Simonsson et al. | 370/329 |

FOREIGN PATENT DOCUMENTS

| CN | 101489255 A | 7/2009 |
|---|---|---|
| CN | 102014491 A | 4/2011 |
| CN | 102149148 A | 8/2011 |

(Continued)

OTHER PUBLICATIONS

Notification of Transmittal of the International Search Report and the Written Opinion of the International Searching Authority, or the Declaration, PCT/CN2012/081590, mailed Nov. 29, 2012, 11 pages.

(Continued)

*Primary Examiner* — Khaled Kassim
*Assistant Examiner* — Zhaohui Yang
(74) *Attorney, Agent, or Firm* — Slater & Matsil, L.L.P.

(57) ABSTRACT

A system, a device and a method for allocating A/N resources are disclosed. In one embodiment the method comprises indicating an acknowledgement or negative acknowledgement (A/N) channel of a user equipment in a first cell, the A/N channel according to a first value and a second value, wherein the first value is determined by a physical layer parameter, wherein the second value is indicated by a high layer signaling, and wherein the A/N channel corresponds to a downlink transmission of a second cell.

20 Claims, 6 Drawing Sheets

(56) References Cited

FOREIGN PATENT DOCUMENTS

WO    WO-2010/083782    *    7/2010    ............... H04L 1/18
WO       2011014840 A1       2/2011

OTHER PUBLICATIONS

3rd Generation Partnership Project; "Technical Specification Group Radio Access Network; Evolved Universal Terrestrial Radio Access (E-UTRA); Physical Channels and Modulation (Release 10)", 3GPP TS 36.211, v10.2.0, Jun. 2011, 103 pages.
3rd Generation Partnership Project; "Technical Specification Group Radio Access Network; Evolved Universal Terrestrial Radio Access (E-UTRA); Multiplexing and Channel Coding (Release 10)", 3GPP TS 36.212, v10.2.0, Jun. 2011, 78 pages.
3rd Generation Partnership Project; "Technical Specification Group Radio Access Network; Evolved Universal Terrestrial Radio Access (E-UTRA); Physical Layer Procedures (Release 10)", 3GPP TS 36.213, v10.2.0, Jun. 2011, 120 pages.
3rd Generation Partnership Project, Technical Specification Group Radio Access Network; Evolved Universal Terrestrial Radio Access (E-UTRA); Further Advancements for E-UTRA Physical Layer Aspects (Release 9), 3GPP TS 36.814, v9.0.0, Mar. 2010, 104 pages.
3rd Generation Partnership Project, Technical Specification Group Radio Access Network; Coordinated Multi-Point Operation for Lte Physical Layer Aspects (Release 11), 3GPP TT 36.819, v1.1.0, Aug. 2011, 70 pages.
Extended European Search Report received in Application No. 12833993.4-1851, mailed Jun. 4, 2014, 11 pages.
Catt, "Benefits of Carrier Indicator on Multi-Channel ACK/NACK Transmission," R1-093537, 3GPP TSG RAN WG1 Meeting #58, Shenzhen, China, Aug. 24-28, 2009, 4 pages.
Panasonic, "Uplink Enhancement for Rel. 11," R1-112367, 3GPP TSG-RAN WG1 Meeting #66, Athens, Greece, Aug. 22-26, 2011, 4 pages.
Nokia Siemens Network, "On the PUCCH Modifications for CoMP," 3GPP TSG RAN WG1 Meeting #66, R1-112387, Athens, Greece, Aug. 22-26, 2011, 4 pages.
Panasonic, "Remaining Details for SPS Operation During Carrier Aggregation," R2-102759, 3GPP TSG-RAN WG2 Meeting #70, May 10-14, 2010, Montreal, Canada, 2 pages.
Samsung, et al., "Mapping Between PDCCH Index and UL A/N Index for Dynamic A/N ChannelsOn Remaining Issues of PUCCH Slot Based CS/OC Remapping," R1-0813741606, 3GPP TSG RAN WG1 #52, Shenzhen, CN, Mar. 31-Apr. 4, 2008, 6 pages.
3GPP TS 136 211 LTE; Evolved Universal Terrestrial Radio Access (E-UTRA); Physical Channels and Modulation (3GPP TS 36.211 version 9.1.0 Release 9), Apr. 2004, 87 pages.
3GPP TS 136 213 LTE; Evolved Universal Terrestrial Radio Access (E-UTRA); Physical Layer Procedures (3GPP TS 36.213 version 9.2.0 Release 9), Jun. 2010, 82 pages.
Ericsson, Physical-layer Parameters to be Configured by RRC, TSG-RAN WG1 #53, R1-082148, Kansas City, US, May 5-9, 2008, 13 pages.

* cited by examiner

RESOURCES OF CELL A

RESOURCES OF CELL B

METHOD AND APPARATUS FOR UPLINK CONTROL SIGNALING

TECHNICAL FIELD

The present invention relates generally to wireless communications, and more particularly to a system and method for communicating in a wireless communications system.

BACKGROUND

Wireless communications systems have made great advances in recent history, now offering near wireline communications system data rates, excellent reliability, low deployment costs, high degree of mobility, and so forth. With such a long list of advantages, wireless communications systems and attendant users are expected grow at a faster rate than ever before.

CoMP (Cooperated Multi-Point Transmission) scheme is considered for Long Term Evolution-Advanced (LTE-A) as a tool to improve the coverage of high data rates, the cell-edge throughput and/or to increase system throughput in both high load and low load scenarios. Downlink coordinated multi-point transmission implies coordination among multiple transmission points.

SUMMARY OF THE INVENTION

In accordance with an embodiment of the present invention, a method comprises indicating an acknowledgement or negative acknowledgement (A/N) channel of a user equipment in a first cell, the A/N channel according to a first value and a second value, wherein the first value is determined by a physical layer parameter, wherein the second value is indicated by a high layer signaling, and wherein the A/N channel corresponds to a downlink transmission of a second cell.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to embodiments in a specific context, namely a method for feeding back acknowledge, negative acknowledge (A/N) information in a CoMP. The invention may also be applied, however, for A/N information feedback methods for any other communication network.

CoMP is considered for LTE-Advanced (LTE-A) as a tool to improve the coverage of high data rates, the cell-edge throughput and/or to increase system throughput in both high load and low load scenarios. Downlink coordinated multi-point transmission implies coordination among multiple transmission points.

Joint processing (JP) is one of CoMP schemes which includes joint transmission and dynamic point selection. Joint transmission means simultaneously transmitting data to a single UE from multiple transmission points. Dynamic point selection means transmitting physical downlink shared channel (PDSCH) data from one point at a time.

A heterogeneous network (Het-Net) may be described as a communications system made up of full power cells, such as macro cells, typically deployed as a planned network by a service provider, and low power nodes (LPN), such as pico cells, femto cells, and so forth, that may be deployed by a service provider and/or a subscriber to help improve performance in high subscriber density areas or low coverage areas.

The standards body for LTE-A has performed extensive evaluations of CoMP techniques as part of the CoMP study item. Four agreed deployment scenarios are as follows:

Scenario 1: Homogeneous network with intra-site CoMP

Scenario 2: Homogeneous network with high Tx power RRHs (Remote Radio Heads)

Scenario 3: Heterogeneous network with low power RRHs within the macro cell coverage where transmission/reception points created by the RRHs have different cell IDs as the macro cell Scenario 4: Heterogeneous network with low power RRHs within the macro cell coverage where the transmission/reception points created by the RRHs have the same cell IDs as the macro cell In a FDD (frequency duplex division) and TDD (time duplex division) system, a cell has its downlink resources carrying the information from the Network to UEs and uplink resources carrying the information from UEs to the Network.

Figure 2A:
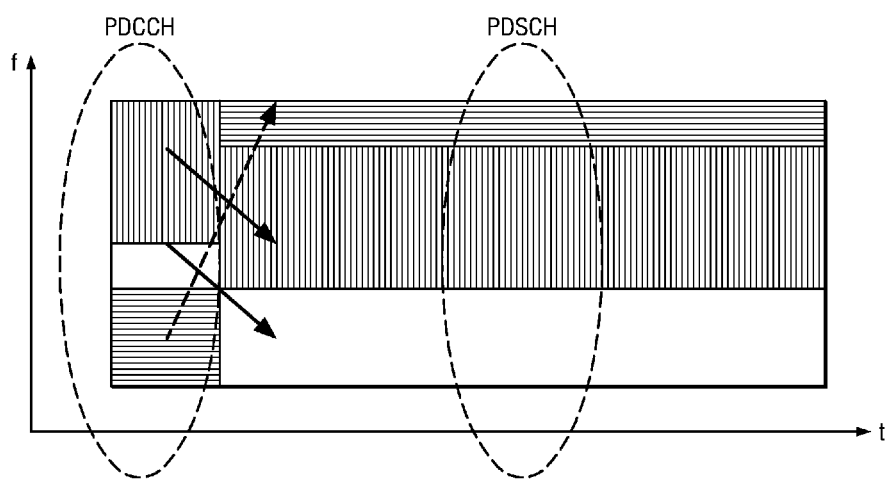
FIG. 2a shows one subframe comprising PDCCH and PDSCH in LTE and LTE-A.

Downlink (DL) and uplink (UL) control data transmissions may be organized in radio frames comprising of a number of consecutive subframes. Each subframe may comprise a number of consecutive OFDM symbols. In a regular DL subframe, the OFDM symbols are divided into a control region and a data region. The control region may comprise physical downlink control channels (PDCCH) and the data region may comprise physical downlink shared channels (PDSCH). The data region follows the control region. This is shown in FIG. 2a.

Figure 2B:
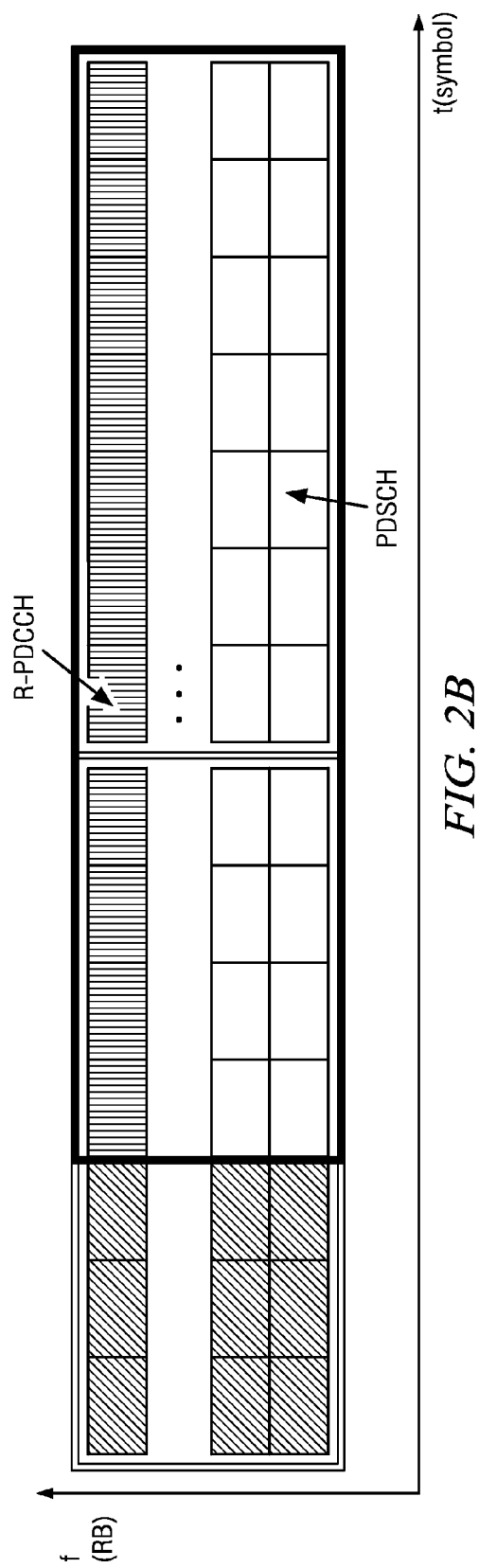
FIG. 2b shows a R-PDCCH and PDSCH in LTE and LTE-A.

The relationship between R-PDCCH (relay PDCCH)/E-PDCCH (enhanced PDCCH) and PDSCH/PUSCH is similar to that between PDCCH and PDSCH/PUSCH except that the resource occupation style is different. In FIG. 2b, R-PDCCH (vertical line boxes) and PDSCH (clear boxes) are frequency-division multiplexed in a time slot. In the frequency domain, a set of RBs is semi-statically configured for potential R-PDCCH transmission, from which a subset can be allocated for each R-PDCCH, shown in FIG. 2b. In LTE-A Release-10, R-PDCCH are used by the donor eNB (DeNB) to schedule the transmissions on the backhaul link between the DeNB and a Relay node.

The PDCCH region comprises control channel elements (CCEs) which can be allocated to a PDCCH. The configuration of how many PDDCHs are mapped to CCEs is flexible. PDCCH candidates of a given UE depending on their aggregation level can be mapped to a search space (a group of consecutive CCEs) of the UE.

A UE may first detect the PDCCH(s) before acquiring the corresponding PDSCH or sending the physical uplink shared channels (PUSCH). Multiple PDCCHs are multiplexed within the control region. A UE may blindly search for a PDCCH in its search spaces within the control region of a subframe. If a UE is unable to detect a proper PDCCH then there is no PDCCH for the UE in this subframe.

Figure 2C:
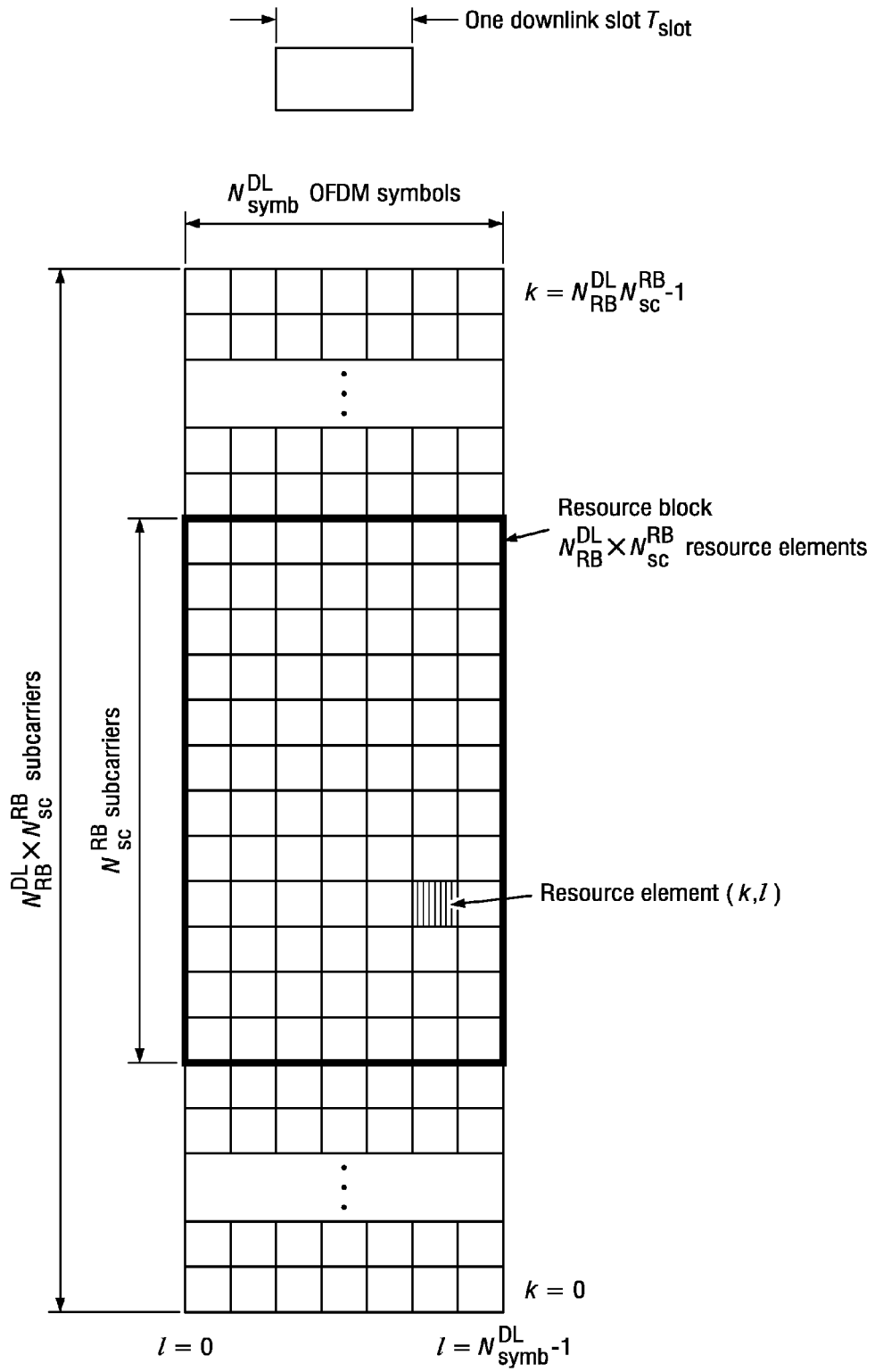
FIG. 2c shows a resource block (RB) according to specification 36.211.

Referring now to FIG. 2c, according to standard 36.211, the transmitted signal in each slot is described by a resource grid of $N_{RB}^{DL}N_{sc}^{RB}$ subcarriers and $N_{symb}^{DL}$ OFDM symbols, where $N_{RB}^{DL}$ denotes the number of downlink RBs, $N_{sc}^{RB}$ denotes the number of resource elements in a resource block, and $N_{symb}^{DL}$ is the number of OFDM symbols in a slot. Each element in the resource grid for antenna port p is called a resource element and is uniquely identified by the index pair (k,l) in a slot where k=0, ..., $N_{RB}^{DL}N_{sc}^{RB}-1$ and l=0, ..., $N_{symb}^{DL}-1$ are the indices in the frequency and time domains, respectively.

According to standard 36.211, section 6.2.4, resource-element groups are used for defining the mapping of control channels to resource elements. A resource-element group is represented by the index pair (k', l') of the resource element with the lowest index k in the group with all resource elements in the group having the same value of l. The set of resource elements (k, l) in a resource-element group depends on the number of cell-specific reference signals configured. A resource-element group consists of 4 resource elements.

According to standard 36.213, section 9.1.1., paragraph 29-34, the physical downlink control channel carries scheduling assignments and other control information. A physical control channel is transmitted on an aggregation of one or several consecutive control channel elements (CCEs), where a control channel element corresponds to 9 resource element groups. The number of resource-element groups not assigned to PCFICH or PHICH is $N_{REG}$. The CCEs available in the system are numbered from 0 and $N_{CCE}-1$ where $N_{CCE}=\lfloor N_{REG}/9 \rfloor$. The PDCCH supports multiple formats as listed in Table 1. A PDCCH consisting of n consecutive CCEs may only start on a CCE fulfilling i mod n=0, where i is the CCE number. Multiple PDCCHs can be transmitted in a subframe.

TABLE 1

| PDCCH format | Number of CCEs | Number of resource-element groups | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

The control region consists of a set of CCEs, numbered from 0 to $N_{CCE,k}-1$, where $N_{CCE,k}$ is the total number of CCEs in the control region of subframe k. The UE may monitor a set of PDCCH candidates for control information in every non-DRX (discontinuous received) subframe, where monitoring implies attempting to decode each of the PDCCHs in the set according to all the monitored downlink control information (DCI) formats. The set of PDCCH candidates to monitor are defined in terms of search spaces, where a search space $S_k^{(L)}$ at aggregation level L∈{1,2,4,8} is defined by a set of PDCCH candidates. The CCEs corresponding to PDCCH candidate m of the search space $S_k^{(L)}$ are given by $L \cdot \{(Y_k+m) \bmod \lfloor N_{CCE,k}/L \rfloor\}+i$ where $Y_k$ is defined below, i=0, ..., L−1 and m=0, ..., $M^{(L)}-1$. $M^{(L)}$ is the number of PDCCH candidates to monitor in the given search space.

The UE may monitor one common search space at each of the aggregation levels 4 and 8 and one UE-specific search space at each of the aggregation levels 1, 2, 4, 8. The common and UE-specific search spaces may overlap. The aggregation levels defining the search spaces are listed in Table 2. The DCI formats that the UE may monitor depend on the configured transmission mode.

TABLE 2

| Type | Search space $S_k^{(L)}$ Aggregation level L | Search space $S_k^{(L)}$ Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

For the common search spaces, $Y_k$ is set to 0 for the two aggregation levels L=4 and L=8. For the UE-specific search space $S_k^{(L)}$ at aggregation level L, the variable $Y_k$ is defined by $Y_k=(A \cdot Y_{k-1}) \bmod D$ where $Y_{-1}=n_{RNTI}\neq 0$, A=39827, D=65537 and k=$\lfloor n_s/2 \rfloor$, $n_s$ is the slot number within a radio frame. The RNTI (Radio Network Temporary Identifier) value used for $n_{RNTI}$ can be various for a UE, it can have more than one RNTI simultaneously for different purposes, for example, for different traffic.

Hybrid automatic repeat request (Hybrid ARQ or HARQ) is a combination of forward error-correcting coding and error detection using the ARQ error-control method. In ARQ, redundant bits are added to data to be transmitted using an error-detecting code such as a cyclic redundancy check (CRC) code. In Hybrid ARQ, forward error correction (FEC) bits (such as Reed-Solomon code, Convolutional code or Turbo code) are added to the existing Error Detection (ED) bits (e.g., CRC) to correct a subset of all errors while relying on ARQ to detect uncorrectable errors.

According to standard 36.213, section 10.1, an acknowledgement (ACK) or negative acknowledgement (NACK) is sent back to the transmitter to indicate whether the transmission is decoded successfully or not.

Uplink control information (UCI) in subframe n shall be transmitted
    on physical uplink control channels (PUCCH) using format 1/1a/1b or 2/2a/2b if the UE is not transmitting on PUSCH in subframe n
    on PUSCH if the UE is transmitting on PUSCH in subframe n unless the PUSCH transmission corresponds to a Random Access Response Grant or a retransmission of the same transport block as part of the contention based random access procedure, in which case UCI is not transmitted The following combinations of uplink control information on PUCCH are supported:
    HARQ-ACK using PUCCH format 1a or 1b
    HARQ-ACK using PUCCH format 1b with channel selection
    Scheduling request (SR) using PUCCH format 1
    HARQ-ACK and SR using PUCCH format 1a or 1b
    CQI using PUCCH format 2

CQI and HARQ-ACK using PUCCH format
2a or 2b for normal cyclic prefix
2 for extended cyclic prefix The scrambling initialization of PUCCH format 2, 2a and 2b is by the C-RNTI. The parameter Simultaneous-AN-and-CQI provided by higher layers determine if a UE can transmit a combination of CQI and HARQ-ACK on PUCCH in the same subframe. For FDD, the UE shall use PUCCH resource $n_{PUCCH}^{(1)}$ for transmission of HARQ-ACK in subframe n, where for a PDSCH transmission indicated by the detection of a corresponding PDCCH in subframe n-4, or for a PDCCH indicating downlink semi-persistent scheduling (SPS) release (defined in section 9.2 of 36.213) in subframe n-4, the UE shall use $n_{PUCCH}^{(1)} = n_{CCE} + N_{PUCCH}^{(1)}$, where $n_{CCE}$ is the number of the first CCE used for transmission of the corresponding DCI assignment and $N_{PUCCH}^{(1)}$ is configured by higher layers.

for a PDSCH transmission where there is not a corresponding PDCCH detected in subframe n-4, the value of $n_{PUCCH}^{(1)}$ is determined according to higher layer configuration.

Figure 1:
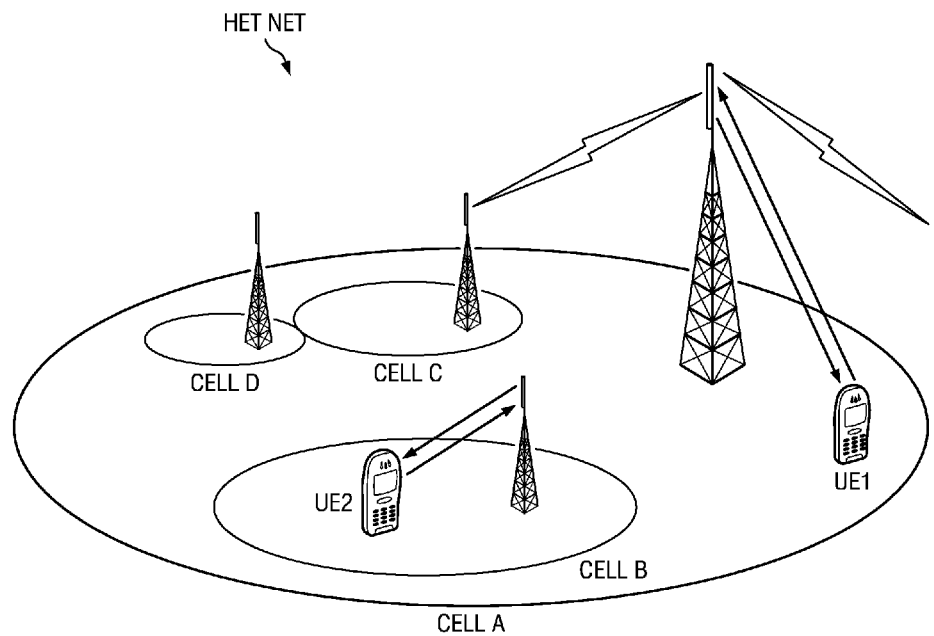
FIG. 1 shows a heterogeneous network (Het-Net)

A UE typically receives control signaling and data in DL resources of a cell and sends back control signaling and data in the UL resources of the same cell. For example, CoMP scenario 3 is shown in FIG. 1: A large (full power) cell or macro cell A covers a large area, and small cells such as pico or femto cells (cells B-D) cover smaller areas. User Equipment UE1, UE2 may move freely within the HetNet. The UEs may communicate with the different cells. For example, UE1 is located within cell A and communicates bi-directionally with cell A. In contrast, UE2 is located within the area of cell B and communicates bi-directionally with cell B.

When a UE receives encoded data from a cell the UE needs to feed back an acknowledgment (ACK) or a negative acknowledgement (NACK) to inform the transmitter that the data were successfully received or not. The UE may transmit the ACK or NACK (A/N) on PUCCH channels in the UL resources. The A/N channels may have a predefined position in the PUCCH of the UL resource as introduced in the previous part.

Figure 3A:
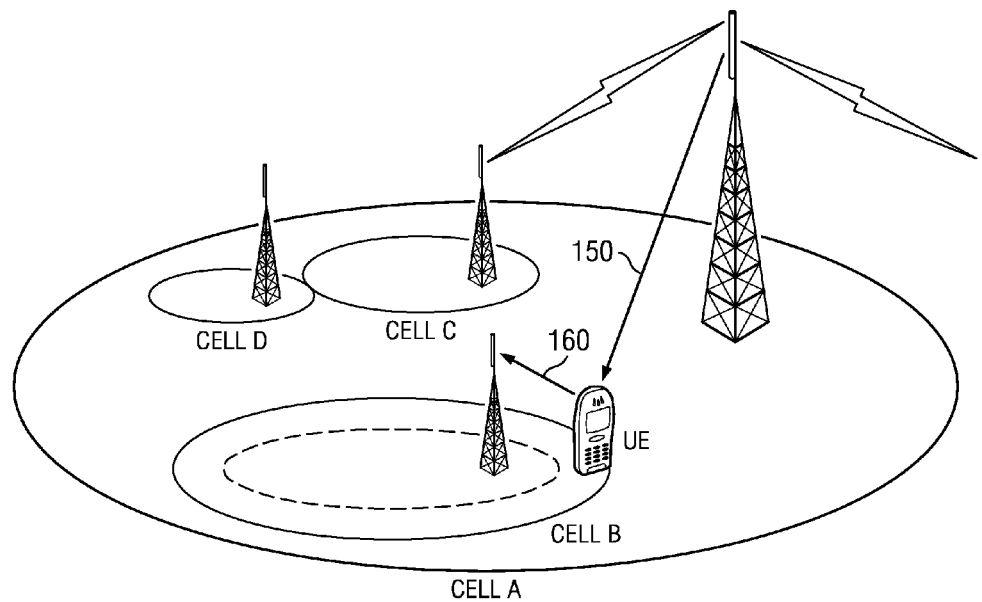
FIG. 3a shows a heterogeneous network (Het-Net)

A problem may arise for a UE if the UE moves along or in an area close to an edge of cell B as shown in FIG. 3A. The DL signals from cell B to the UE may experience a high level of interference from cell A, especially when range extension is adopted. On the other hand, the UL channel quality to cell B may be better than UL channel quality to cell A because the UE is closer to cell B than to cell A. The reception power at cell B may be better than the reception power at cell A.

In one embodiment a UE receives DL 150 signals from cell A and sends UL 160 signals to cell B. This may be advantageous because it improves the reception performance of the system (Het-Net). For a UE located at the edge of cell B the UE may receive the signals from cell A and may send signals, for example A/N signals, to cell B. With these additional A/N signals to be communicated to cell B, more A/N channel resources in the UL of the cell B are needed. In one embodiment unused A/N channel resources in the UL resources of cell B are filled with A/N information related to DL transmission of cell A.

Figure 3B:
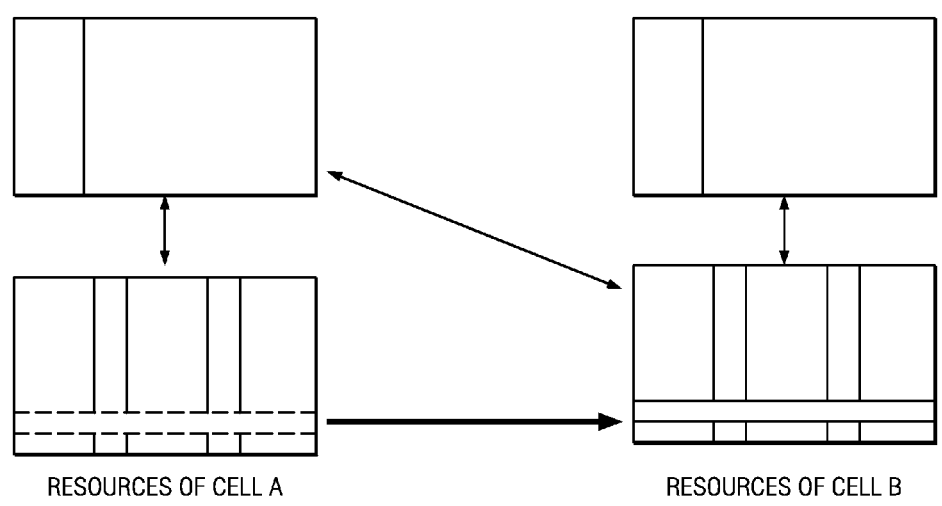
FIG. 3b shows corresponding DL/UL resources.

FIG. 3B shows that DL transmissions of cell A not only correspond to UL transmissions of cell A and DL transmissions of cell B not only correspond to UL transmissions of cell B but also that DL transmissions of cell A may correspond to UL transmissions of cell B.

FIG. 3B shows that each cell comprises at least one base-station/access point or that one base-station serves at least one cell. A base-station may comprise circuitry to serve a cell, e.g., circuitry configured to receive uplink transmission and configured to transmit downlink transmissions. Alternatively, the base-station may comprise circuitry to serve several cells. The circuitry may comprise baseband chips, RF front end chips, antenna circuitry and memory chips. The baseband chips may be configured to process data such as transforming, encoding, decoding mapping, etc.

In one embodiment a network, such as a Het-Net, comprises a first cell served at least by one base station and a second cell served by at least one base station. The base stations which serve the first cell and which serve the second cell may be the same or may be different. A UE moving within the system may receive a first value by a physical layer signaling and a second value by a high layer signaling.

The UE or mobile station may be a device used directly by an end-user. It can be a hand-held telephone, a laptop computer equipped with a mobile broadband adapter, or any other device. A UE may comprise circuitry configured to receive downlink transmissions and configured to transmit uplink transmissions. The UE may comprise baseband chips, RF front end chips, antenna circuitry and memory chips. The baseband chips may be configured to process data such as transforming, encoding, decoding mapping, etc.

The UE may calculate an A/N channel position in the first cell, wherein the A/N channel position is based on the first value and the second value. The calculated A/N channel position may correspond to a downlink transmission of a first cell or to a downlink transmission of a second cell. The calculated A/N channel position may correspond to a downlink control signaling transmission such as PDCCH transmission and/or E-PDCCH transmission and/or a downlink data transmission.

Figure 4A:
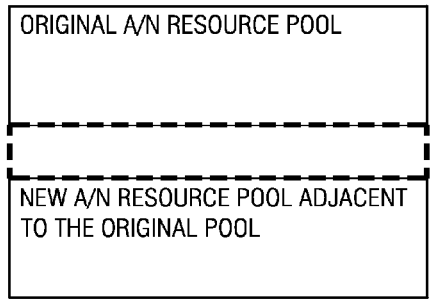
FIG. 4a shows an resource pool allocation.

FIG. 4A shows an original A/N channel resource pool and a new A/N channel resource pool. The original A/N channel resource pool may correspond to downlink transmissions to UEs from cell B and the new A/N channel resource pool may correspond to downlink transmission to UEs from cell A or from cell B. In other words, the new A/N channel resource pool comprises A/N channel feedbacks originally occurring in a cell or cells other than the cell B, for example, in cell A. The new A/N resource pool may be located adjacent to the original A/N resource pool.

According to one protocol, one UL resource block (RB) provides a certain number of A/N channels, for example 18. An RB will be used for PUCCH as long as there is one PUCCH channel reserved on this RB. For example, if there are 19 PUCCH channels, then there are two RBs needed because ceiling (19/18)=2. The second RB holds only 1 PUCCH channel. The remaining 17 PUCCH channels of the second RB are reserved but unoccupied.

The remainder of the channels in the second RB is reserved for PUCCH channels but remains unoccupied due to the exceeding number of DL CCEs. Table 3 below shows the number of A/N channels needed in different cases which is equal to the number of DL CCEs. For example, Table 3 shows that the channels needed is 1 for $N_{RB}=15$, $N_g=2$, Port=1 and CFI=1, or similarly that the channels needed is 2 for $N_{RB}=25$, $N_g=2$, Port=1 and CFI=1. Most of the time, the total number of reserved but unoccupied PUCCH channels is not zero. Frequently there are more than 10 channels reserved but not utilized.

TABLE 3

| $N_{RB}$ | $N_g$ | PHICH | 1 Port CFI = 1 | CFI = 2 | CFI = 3 | 2 Ports CFI = 1 | CFI = 2 | CFI = 3 | 4 Ports CFI = 1 | CFI = 2 | CFI = 3 |
|---|---|---|---|---|---|---|---|---|---|---|---|
| 15 | 1/6 | 1 | 2 | 7 | 12 | 2 | 7 | 12 | 2 | 5 | 10 |
|  | 1/2 | 1 | 2 | 7 | 12 | 2 | 7 | 12 | 2 | 5 | 10 |
|  | 1 | 2 | 2 | 7 | 12 | 2 | 7 | 12 | 2 | 5 | 10 |
|  | 2 | 4 | 1 | 6 | 11 | 1 | 6 | 11 | 1 | 4 | 9 |
| 25 | 1/6 | 1 | 4 | 13 | 21 | 4 | 13 | 21 | 4 | 10 | 18 |
|  | 1/2 | 2 | 4 | 12 | 21 | 4 | 12 | 21 | 4 | 10 | 18 |
|  | 1 | 4 | 3 | 12 | 20 | 3 | 12 | 20 | 3 | 9 | 17 |
|  | 2 | 7 | 2 | 11 | 19 | 2 | 11 | 19 | 2 | 8 | 16 |
| 50 | 1/6 | 2 | 10 | 26 | 43 | 10 | 26 | 43 | 10 | 21 | 37 |
|  | 1/2 | 4 | 9 | 26 | 42 | 9 | 26 | 42 | 9 | 20 | 37 |
|  | 1 | 7 | 8 | 25 | 41 | 8 | 25 | 41 | 8 | 19 | 36 |
|  | 2 | 13 | 6 | 23 | 39 | 6 | 23 | 39 | 6 | 17 | 34 |
| 75 | 1/6 | 2 | 15 | 40 | 65 | 15 | 40 | 65 | 15 | 32 | 57 |
|  | 1/2 | 5 | 14 | 39 | 64 | 14 | 39 | 64 | 14 | 31 | 56 |
|  | 1 | 10 | 12 | 37 | 62 | 12 | 37 | 62 | 12 | 29 | 54 |
|  | 2 | 19 | 9 | 34 | 59 | 9 | 34 | 59 | 9 | 26 | 51 |
| 100 | 1/6 | 3 | 20 | 54 | 87 | 20 | 54 | 87 | 20 | 43 | 76 |
|  | 1/2 | 7 | 19 | 52 | 86 | 19 | 52 | 86 | 19 | 41 | 75 |
|  | 1 | 13 | 17 | 50 | 84 | 17 | 50 | 84 | 17 | 39 | 73 |
|  | 2 | 25 | 13 | 46 | 80 | 13 | 46 | 80 | 13 | 35 | 69 |

It is advantageous to utilize the already existing and unused A/N channels first before starting to assign a whole new RB previously assigned for data transmission. As a result, the UEs transmitting signals to cell B while receiving signals from another cell/other cells should be informed of the size of the original A/N channel resource pool. The size of the original A/N channel resource pool is based on a parameter or a set of parameters. For example, the size of the original A/N channel resource pool may depend on the number of CCEs of the subframes of cell B. The number of CCEs may change from subframe to subframe and so does the size of the original A/N channel resource pool. The number of CCEs in a subframe may be determined by a set of parameters, e.g., system bandwidth, the number of occupied OFDM symbols of the DL control region of cell B which is indicated by CFI (control format indicator) value in dynamic physical CFI channel (PCFICH), the number of antenna ports, and physical HARQ indicator channel (PHICH) resources signaled in the physical broadcast channel (PBCH) ($N_g$). An example of these parameters is provided in Table 3 above.

In one embodiment the new A/N resource pool may also be formed in a separate new RB or in a plurality of separate new RBs. The new A/N resource pool may be located adjacent or next to the last RB of the original A/N resource pool. The UE may also be informed of the size of the original A/N channel resource pool. A UE can calculate the number of RBs for the original A/N resource pool assuming whole RBs are reserved for PUCCHs, like calculating the number of remaining available PUSCH RBs.

The UE in a CoMP is typically well informed of the configurations of cell A and cell B. The UE may be well informed of the number of CCEs of cell B to find/calculate the starting point of the new pool of A/N channels, either for using the remainder channels of an existing RB and/or for using separate RBs. A parameter for setting the starting point of the new A/N resource pool may be the dynamic CFI value. One way to provide the UE with the dynamic CFI value of another cell is to mask the dynamic CFI value to the cyclic redundancy check (CRC) bits in a DL transmission of cell A. The RNTI of the UE is already a mask for the CRC of its DL transmissions, if more information is masked on the CRC, the combined mask is another series of binary bits, which is another RNTI. This is equivalent to giving a UE more than one RNTI for communication, the UE de-masks the RNTIs to obtain the CFI value Alternatively, the CFI value may explicitly be provided to the UE by reusing a field or fields in the current DCI or creating a new field to convey the dynamic CFI value which may increase the number of the blinding decoding attempts. A new transmission mode or modes may be needed to reduce the number of blind decoding attempts.

Figure 4B:
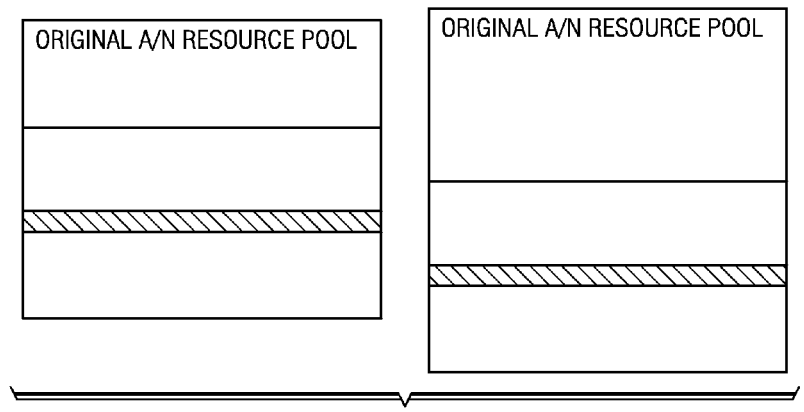
FIG. 4b shows one embodiment of a specific allocation of an A/N channel within an A/N resource pool.

FIG. 4b shows the relative position of a specific A/N channel within the new pool of A/N channels. The relative position of the A/N channels within the new pool of A/N channels may be indicated in a semi-static manner since it may change very slowly. The UE may indicate a specific A/N channel within the new pool of A/N channels via a higher layer signaling, for example, Radio Resource Control (RRC) layer signaling.

In one embodiment the high layer, for example, RRC layer, indicates to the UE a relative location of an A/N channel within the new pool of A/N channels or a relative location to the original A/N channel resource pool semi-statically, then inform the UE about the size of the original A/N channel resource pool dynamically because the size of the original A/N channel resource pool changes dynamically.

For example, indicate a UE a relative location-5, then inform the UE about the CFI value showing that the number of PDCCH symbols is 2. The UE may receive other information such as PHICH parameter, system bandwidth, etc. to help the UE to determine the exact size of the original A/N channel resource pool or the numbers of RBs reserved for the original A/N channel resource pool. In another example the UE just receives the system bandwidth, assume the smallest PHICH parameter which results in the largest number of CCEs. So the formula for a CoMP UE can be $n_{PUCCH}^{(1)} = n + N_{PUCCH}$, where $n_{PUCCH}^{(1)}$ is the PUCCH channel location; n is the starting point of the new pool of A/N channels, here it is a CoMP UE PUCCH area which is a function of system bandwidth, CFI, and $N_g$ of the UE attached cell; $N_{PUCCH}^{(1)}$ is indicated by high layer signaling, for example RRC layer signaling.

The UE may obtain the parameters and the signaling to find/calculate its UL A/N channels assigned in the cell B corresponding to its DL transmission from cell A.

This method can also be used for A/N feedback of R-PDCCH, or R-PDCCH like scheduled transmissions in cell A or in cell B, for example, E-PDCCH. If it is the E-PDCCH in cell B, then a UE knows the CFI value by PCFICH in cell B. The starting point of the new pool of A/N channels may be decided by factors besides the original A/N resource pool, for example, the A/N resources corresponding to R-PDCCH/E-PDCCH of cell B. However, the indication method of CFI value can also be extended to the new factors: a certain related value which a UE may use to find/calculate its A/N channels, and the value is indicated dynamically by physical layer signaling.

Figure 5:
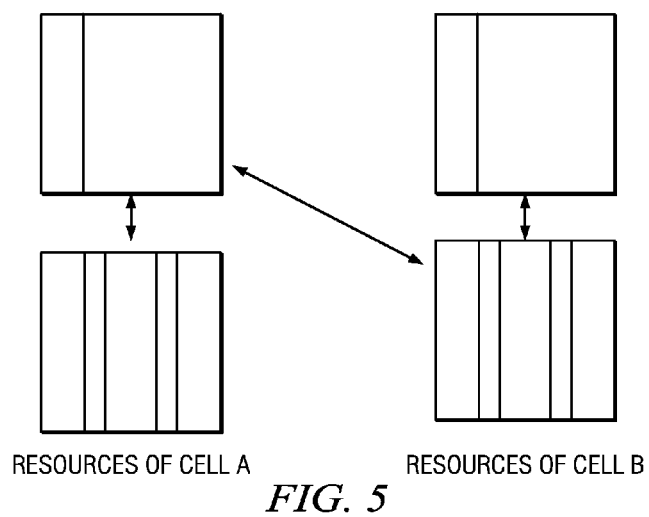
FIG. 5 shows one embodiment of a specific allocation of an A/N channel within uplink resource block.

In one embodiment the A/N channel location in the UL of cell B corresponding to DL transmissions of cell A is based on the CCE index in the DL of cell A. As can be seen from FIG. 5, the A/N channel is located at the "same" physical location in the UL resource of cell B as it would have been located in the UL resource of cell A if it were transmitted in UL resource of cell B.

Figure 6:
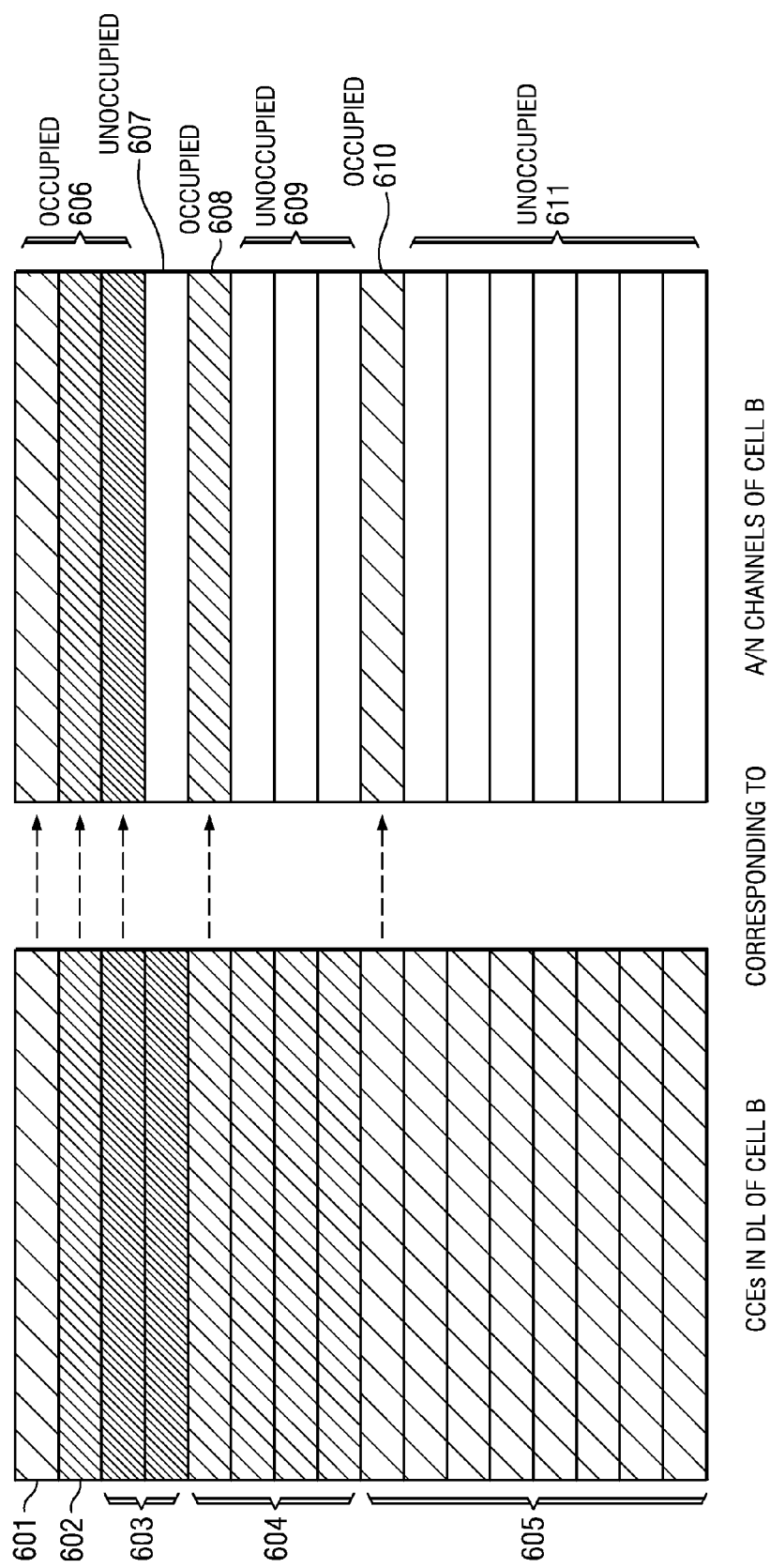
FIG. 6 shows one embodiment of a resource allocation.

FIG. 6 shows a further embodiment of allocating new A/N channels of cell A to original A/N channels of cell B. Depending on their aggregation level, PDCCHs may occupy more than 1 CCE. For example, the first PDCCH 601 and the second PDCCH 602 each occupy 1 CCE, the third PDCCH 603 occupies 2 CCEs, the fourth PDCCH 604 occupies 4 CCEs and the fifth PDCCH 605 occupies 8 CCEs, accordingly 1, 2, 4, and 8 A/N channels are reserved. The UE may only use the first A/N channels 606-610 reserved for it in the original A/N channel resource pool to feed back the A/N signal. The remaining A/N channels 607-611 are unoccupied. Moreover, UL grants are also allocated in the control region which do not need A/N channels but corresponding A/N channels will also be reserved since the UL grants also occupy a certain number of CCEs. Accordingly, the remaining unoccupied A/N channels 607-611 of the original resource pool may be available for A/N channel allocation corresponding to downlink transmissions in cell A.

In one embodiment a function of functions may be used to map the A/N channels from cell A to cell B. One such function is the hash function used in the PDCCH search space. The function(s) may be known by the UE and the cells because the function(s) may be indicated or defined in the specs. For example, cell A indicates the A/N channel index directly to the UE.

By this method, A/N channels can be indicated to the new A/N resource pool when the A/N channels are corresponding to the DL transmission of other cell/cells or when the A/N channels are corresponding to the DL transmission of the same cell but without correspondence to the original A/N resource pool. Secondly, it only indicates the relative information by a high layer, so the value range is limited, and it may need fewer bits which reduces the high layer overhead. Finally, if the new A/N resource pool is adjacent to the original A/N resource pool, UL single-carrier property can be preserved. Moreover, in one embodiment the unoccupied A/N channels can be utilized first to reduce resource waste, which is advantageous if the system bandwidth is small.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for operating a user equipment, the method comprising:
   receiving, by the user equipment, a downlink transmission from a transmit point, the downlink transmission carrying data and control information;
   determining, by the user equipment, a physical layer parameter associated with the control information;
   receiving, by the user equipment, a first higher layer signaling parameter;
   receiving, by the user equipment, a second higher layer signaling parameter, the second higher layer signaling parameter being a different parameter than the first higher layer signaling parameter;
   calculating, by the user equipment, an acknowledgement or negative acknowledgement (A/N) channel index by adding a resource offset to a starting control channel element specified by the physical layer parameter, wherein the resource offset has a first value specified by the first higher layer signaling parameter when the A/N channel index is calculated prior to receiving the second higher layer signaling parameter at the user equipment, and wherein the resource offset has a second value specified by the second higher layer signaling parameter when the A/N channel index is calculated after receiving the second higher layer signaling parameter at the user equipment, the second value being different than the first value;
   generating, by the user equipment, acknowledgment information relating to the data; and
   transmitting, by the user equipment, the acknowledgement information to a receive point using uplink resources associated with the A/N channel index.

2. The method of claim 1, wherein the transmit point is positioned at a first network device, and wherein the receive point is positioned at a second network device that participates in a CoMP transmission scheme with the first network device.

3. The method of claim 1, wherein the control information is received over a physical downlink control channel (PDCCH) of a single downlink carrier channel.

4. The method of claim 1, wherein the control information is received over an enhanced physical downlink control channel (ePDCCH) of a single downlink carrier channel.

5. The method of claim 1, wherein transmitting the acknowledgement information includes transmitting the acknowledgement information to two or more receive points.

6. The method of claim 1, wherein the downlink transmission is communicated exclusively over a single carrier channel.

7. The method of claim 6, wherein the single carrier channel is used to transport the acknowledgement information.

8. The method of claim 6, wherein the single carrier channel belongs to the same carrier duplexing group as an uplink carrier channel used to transport the acknowledgement information.

9. A method comprising:
   communicating, by a network device, a first higher layer signaling parameter to a plurality of user equipments (UEs) via higher layer signaling; and
   communicating, by the network device, a second higher layer signaling parameter to a single UE via higher layer signaling, the second higher layer signaling parameter being a different parameter than the first higher layer signaling parameter, wherein the single UE is one of the plurality of UEs, wherein the first higher layer signaling parameter specifies a first value for a resource offset added to the starting control channel element during calculation of an acknowledgement or negative acknowledgement (A/N) channel index when the single UE calculates the A/N channel index prior to receiving the second higher layer signaling parameter from the network device, wherein the second higher layer signaling parameter specifies a second value for the resource offset added to the starting control channel element during calculation of the A/N channel index when the single UE calculates the A/N channel index after receiving the second higher layer signaling parameter from the network device, the second value being different than the first value, and wherein the A/N channel index corresponds to uplink resources that are reserved for carrying acknowledgment information from the single UE to a receive point, the acknowledgement information relating to a downlink transmission communicated to the single UE by a transmit point.

10. The method of claim 9, wherein the network device is located in a network configured to support coordinated multipoint (CoMP) communications, the network having multiple transmission points that communicate data over a single downlink carrier channel, and wherein at least some of the multiple transmission points are situated in different physical locations.

11. The method of claim 9, wherein the network device is located in a network configured to support coordinated multipoint (CoMP) communications, the network having multiple receive points that communicate data over a single uplink carrier channel, and wherein at least some of the multiple receive points are situated in different physical locations.

12. The method of claim 9, wherein the downlink transmission is communicated exclusively over a single carrier channel.

13. The method of claim 12, wherein the single carrier channel is used to transport the acknowledgement information.

14. The method of claim 12, wherein the single carrier channel belongs to the same carrier duplexing group as an uplink carrier channel used to transport the acknowledgement information.

15. A method for operating a receive point, the method comprising:

receiving, by the receive point, an uplink transmission from one or more user equipments (UEs);

receiving, by the receive point, a first higher layer signaling parameter communicated from a network to a first UE in the one or more UEs via higher layer signaling;

receiving, by the receive point, a second higher layer signaling parameter communicated from the network to the first UE via higher layer signaling, the second higher layer signaling parameter being a different parameter than the first higher layer signaling parameter;

calculating, by the receive point, an acknowledgement or negative acknowledgement (A/N) channel index by adding a resource offset to a starting control channel element specified by a physical layer parameter, wherein the resource offset has a first value specified by the first higher layer signaling parameter when the A/N channel index is calculated prior to the second higher layer signaling parameter being communicated to the first UE, and wherein the resource offset has a second value specified by the second higher layer signaling parameter when the A/N channel index is calculated after the second higher layer signaling parameter is communicated to the first UE, the second value being different than the first value; and decoding, by the receive point, acknowledgement information located in uplink resources associated with the A/N channel index, the acknowledgment information being communicated by the first UE.

16. The method of claim 15, further comprising:

forwarding, by the receive point, the acknowledgment information to a transmit point using a backhaul network, the acknowledgement information corresponding to a downlink transmission communicated from a transmit point to the first UE.

17. The method of claim 16, wherein the physical layer parameter is determined in accordance with control information carried in the downlink transmission.

18. The method of claim 16, wherein the downlink transmission is communicated exclusively over a single carrier channel.

19. The method of claim 18, wherein the single carrier channel is used to transport the acknowledgement information.

20. The method of claim 18, wherein the single carrier channel belongs to the same carrier duplexing group as an uplink carrier channel used to transport the acknowledgement information.

* * * * *